United States Patent
Ohara et al.

(10) Patent No.: US 6,277,046 B1
(45) Date of Patent: Aug. 21, 2001

(54) SILENT CHAIN

(75) Inventors: Hitoshi Ohara; Makoto Kanehira; Shigekazu Fukuda; Yoshihiro Kusunoki; Takayuki Funamoto; Masao Maruyama, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/518,260

(22) Filed: Mar. 3, 2000

(30) Foreign Application Priority Data

Mar. 3, 1999 (JP) .................................................. 11-055062

(51) Int. Cl.$^7$ .................................................. F16G 13/06
(52) U.S. Cl. ........................................... 474/217; 474/215
(58) Field of Search ..................................... 474/212, 213, 474/214, 215, 216, 228, 229, 230, 231

(56) References Cited

U.S. PATENT DOCUMENTS

| | | | | |
|---|---|---|---|---|
| 2,653,485 | * | 9/1953 | MacArthur | 474/215 |
| 3,742,776 | * | 7/1973 | Avramidis | 74/251 S |
| 4,507,106 | * | 3/1985 | Cole, Jr. | 474/215 |
| 4,801,289 | * | 1/1989 | Sugimoto et al. | 474/215 |
| 4,904,231 | * | 2/1990 | Zimmer | 474/214 |
| 5,026,331 | * | 6/1991 | Sugimoto et al. | 474/214 |
| 5,236,399 | * | 8/1993 | Sugimoto et al. | 474/215 |
| 5,242,333 | * | 9/1993 | Sugimoto et al. | 474/212 |
| 5,242,334 | * | 9/1993 | Sugimoto et al. | 474/215 |
| 5,562,559 | * | 10/1996 | Kolhatkar | 474/229 |
| 5,651,746 | * | 7/1997 | Okuda | 474/215 |

* cited by examiner

Primary Examiner—David A. Bucci
Assistant Examiner—Vicky A. Johnson
(74) Attorney, Agent, or Firm—Armstrong, Westerman, Hattori, McLeland & Naughton, LLP

(57) ABSTRACT

Two rocker pins inserted into each of two pin holes of each link plate of a silent chain each include a rocker surface, a first non-contact surface opposed to an inner peripheral surface of the pin hole on a side opposite to the rocker surface, a pair of load-bearing surfaces contiguous with both circumferential ends of the first non-contact surface, and two second non-contact surfaces interconnecting the pair of load-bearing surfaces and both circumferential ends of the rocker surface, respectively. A part of the inner peripheral surface of the pin hole is formed in a pair of pin-seating surfaces which is in register with the pair of load-bearing surfaces of each rocker pin, respectively, to prevent rotation of the rocker pin within the pin hole. Since the load-bearing surfaces are supported by the pin-seating surfaces in an exactly matched or registered condition, rotation and wobbling of the rocker pin within the pin hole are securely prevented. Thus, the rocker pins and the link plates are substantially free from local wear which may often result in an excessive wear elongation of the silent chain.

4 Claims, 4 Drawing Sheets

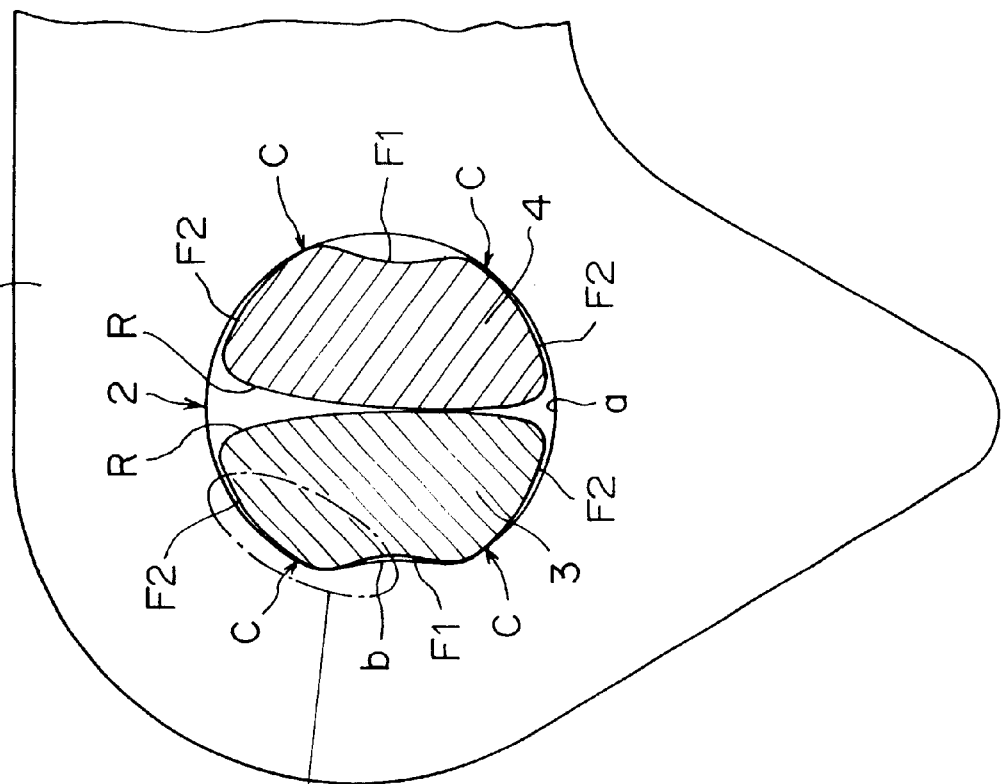
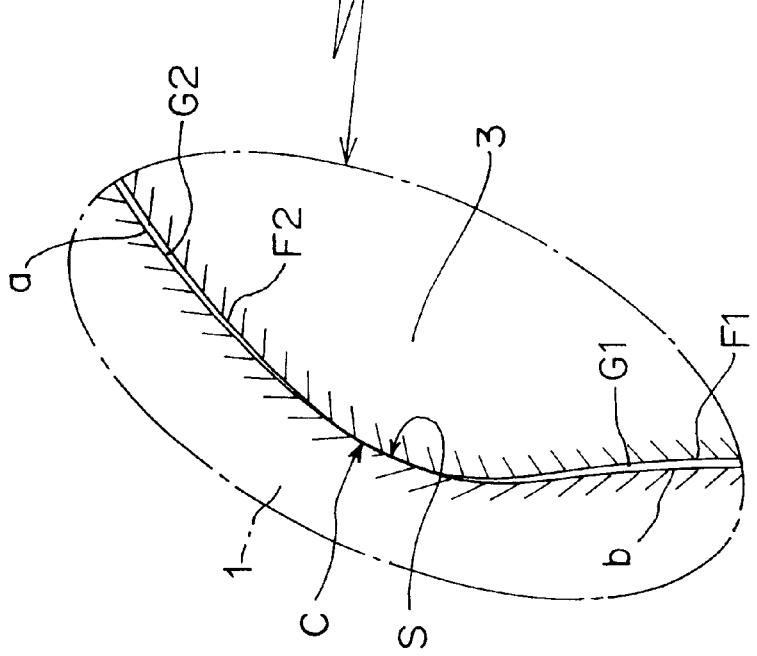

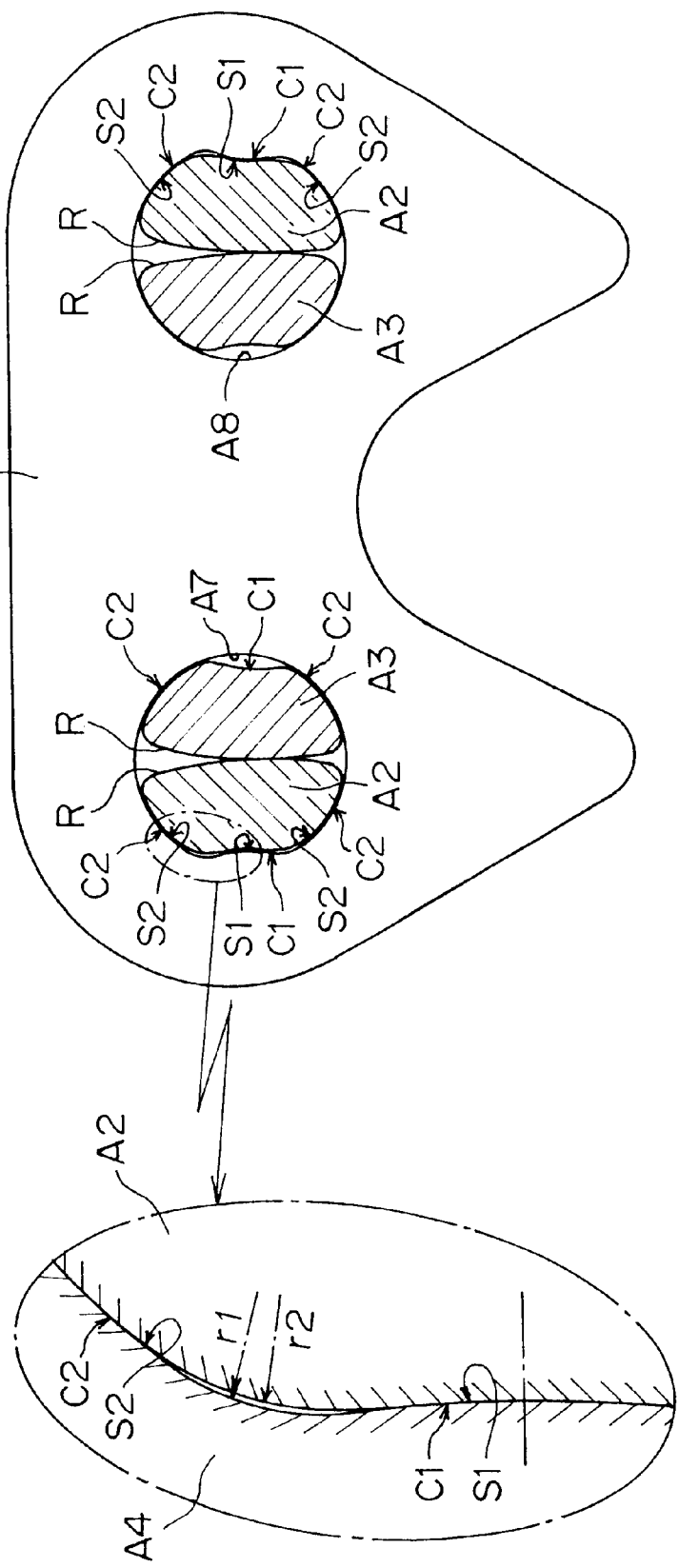

SILENT CHAIN

BACKGROUND OF THE INVENTION

1. Field of the Invention

The present invention relates to a silent chain, and more particularly to such a silent chain which is constructed to diminish wear elongation of the chain.

2. Description of the Related Art

As shown in FIGS. 3 and 4, a conventional silent chain A1 is composed of a large number of link plates A4 which are articulately connected together in an endless fashion by means of plural sets of rocker pins A2, A3 with each set being constituted by two rocker pins. Teeth of a sprocket A5 come into direct meshing engagement with engaging surfaces T of the link plates A4 to perform transmission of power between the sprocket A5 and another sprocket (not shown).

The link plates A4 are arranged in many rows in the transverse direction of the silent chain A1 in such a manner that the link plates A4, which are adjacent to each other back and forth in the traveling direction of the silent chain A1, are sandwiched alternately in the transverse direction.

Of the two rocker pins A2, A3 which constitute each set, one rocker pin A2 is longer than the other rocker pin A3 and has opposite ends fitted into non-circular pin holes formed in guide plates A6 which are arranged adjacent both outsides of the plural, transversely arranged link plates A4 and are guided by side faces of the teeth of the sprocket A5.

As shown in FIG. 5, the rocker pins A2, A3 have the same cross-sectional shape and are inserted into each of the pin holes A7 and A8 through the link plates A4 so as to be opposed to each other so that respective rocker surfaces R of the rocker pins A2, A3 are adjacent to each other.

The rocker pins A2, inserted into the pin holes A7, A8 of each link plate A4 and located closer to the outer end of the link plate A4, each have a concavely arcuate load-bearing surface C1 formed on the side opposite to the rocker surface R and a pair of convexly arcuate load-bearing surfaces C2 formed on both sides of the load-bearing surface C1. The concavely arcuate load-bearing surface C1 and the convexly arcuate load-bearing surfaces C2, C2 come into engagement with a convexly arcuate pin-seating surface S1 and a pair of concavely arcuate pin-seating surfaces S2, S2, respectively, of each pin hole A7, A8 of the link plate A4 so that the rocker pins A2 are prevented from rotating.

The load-bearing surface C1 and each of the load-bearing surfaces C2, C2 are smoothly connected together by a convexly arcuate surface having a small radius of curvature r1 (FIG. 5A). The pin-seating surface S1 and each of the pin-seating surfaces S2, S2 are smoothly connected together by a concavely arcuate surface having a radius of curvature r2 (FIG. 5A) which is slightly smaller than the radius of curvature r1. Due to the different radii of curvature r1 and r2, the convexly arcuate surface and the concavely arcuate surface are spaced by a slight gap or clearance.

On the other hand, the rocker pins A3 inserted into the pin holes A7, A8 of each link plate A4 and located closer to the center of the link plate A4, are each engaged at respective load-bearing surfaces C1 and C2 with pin-seating surfaces of a corresponding one pin hole formed in a longitudinally adjacent link plate (not shown).

As shown in FIG. 3, when the silent chain A1 is entrained on the sprocket 5 and a tensile force is exerted between longitudinally adjacent link plates A4, the rocker surface R of the rocker pin A2 and the rocker surface R of the rocker pin A3 are pressed against each other to effect transfer of the tensile force.

Since the opposed rocker surfaces R and R are each formed in a convexly arcuate shape, it becomes possible to perform a relative rocking motion between the rocker pins A2 and A3, thus permitting bending or articulating of the longitudinally adjacent link plates A4.

In the conventional silent chain A1 constructed as described above, the convexly arcuate pin-seating surface S1 and the two concavely arcuate pin-seating surfaces S2 of each of the pin holes A7, A8 and the concavely arcuate load-bearing surface C1 and the convexly arcuate load-bearing surfaces C2 of the associated rocker pins A2 which are located closer to the outer ends of the link plate A4 are simultaneously brought into engagement with each other to effect transmission of a tensile force while preventing rotation of the rocker pins A2, A3 relative to the link plate A4.

Form the manufacturing point of view, however, it is vary difficult to finish the rocker pins A2, A3 and the pin holes A7, A8 with high accuracies to secure the afore-mentioned simultaneous engagement between the three surfaces S1, S2, S2 of each pin hole A7, A8 and the corresponding surfaces C1, C2, C2 of the rocker pins A2. In practice, it may occur that due to uneven or local engagement, the rocker pins A2, A3 become wobble within the pin holes A7, A8 which is usually accompanied by local wear. Especially, when the wear is concentrated on the pin-seating surfaces S1 of the pin holes A7, A8 or on the load-bearing surfaces C1 of the rocker pins A2, the wear will progressively grow or increase in the longitudinal direction of the silent chain. This will often result in an increased wear elongation of the silent chain.

SUMMARY OF THE INVENTION

It is therefore an object of the present invention to provide a silent chain which is capable of stably holding rocker pins within the pin holes in link plate against wobbling to thereby prevent the occurrence of local wear between the rocker pins and the link plates, thus diminishing wear elongation of the silent chain.

To attain the above object, there is provided, in accordance with the present invention, a silent chain which comprises: a multitude of link plates, each link plate having two pin holes formed therethrough in symmetrical relationship with respect to a center of the link plate; and first and second rocker pins being inserted into each of the two pin holes of each link plate in such a manner that convexly arcuate rocker surfaces of the first and second rocker pins are adjacent with each other to bendably interconnect the link plates. An outer peripheral surface of each of the first and second rocker pins is formed with the rocker surface, a first non-contact surface opposed to an inner peripheral surface of each pin hole on a side opposite to the rocker surface, a pair of load-bearing surfaces contiguous with both circumferential ends of the first non-contact surface, and two second non-contact surfaces interconnecting the pair of load-bearing surfaces and both circumferential ends of the rocker surface, respectively. The inner peripheral surface of each the pin hole has a portion formed in a pair of pin-seating surfaces being in register with the pair of load-bearing surfaces of each the rocker pin, respectively, to prevent rotation of the rocker pin within each the pin hole. When the load-bearing surfaces and the corresponding pin-seating surfaces are in register with each other, the first non-contact surface and each of the second non-contact surfaces define, jointly with the inner peripheral surface of the pin hole, two slight clearances spaced in a circumferential direction of the pin hole.

With the silent chain thus constructed, a tensile force exerted on the silent chain is transmitted between two longitudinally adjacent link plates through the first and second rocker pins disposed in opposite relation with their rocking surfaces held in abutment with each other. In this instance, the pair of load-bearing surfaces of each rocker pin, which are formed on opposite sides of the first non-contact surface, and the pair of pin-seating surfaces which are formed as a part of the inner peripheral surface of each pin hole are brought into intimate face-to-face contact with each other.

Since each rocker pin is supported by two circumferentially spaced inner peripheral surface portions (i.e., the pin-seating surfaces) of the pin hole, rotation and wobbling of the rocker pin within the pin hole are prevented. Furthermore, the clearance formed between the first non-contact surface and each of the second non-contact surfaces of the rocker pin and the inner peripheral surface of each pin hole store therein a lubricating oil supplied from the exterior of the silent chain. The lubricant oil then gradually enters between the load-bearing surfaces and the pin-seating surfaces and forms an oil film between these contacting surfaces.

By virtue of the oil film thus formed, an interface between the load-bearing surfaces of each rocker pin and the pin-seating surfaces of the pin hole is unlikely to encounter boundary lubrication. It is, therefore, possible to diminish abrasive wear between the rocker pin and the inner peripheral surface of the pin hole, thereby eliminating a cause of wear elongation of the silent chain.

Each of the pair of load-bearing surfaces may be formed with a first convexly arcuate surface having one circumferential end connected to the first non-contact surface, and a second convexly arcuate surface contiguous with the other circumferential end of the first convexly arcuate surface and having a radius of curvature smaller than a radius of curvature of the first convexly arcuate surface. In this case, the first convexly arcuate surface comes into intimate face-to-face contact with a corresponding one of the pin-seating surfaces to thereby surely prevent rotation of the rocker pin within the pin hole. At the same time, the second convexly arcuate surface and the corresponding pin-seating surface provide a relatively large contact area therebetween and thus lowers contact pressure between the rocker pin and the inner peripheral surface of the pin hole. This may add to the reduction of wear between the rocker pin and the inner peripheral surface of the pin hole.

BRIEF DESCRIPTION OF THE DRAWINGS

Certain preferred embodiments of the present invention will hereinafter be described in detail, by way of example only, with reference to the accompanying drawings, in which:

FIG. 1 is a fragmentary side view of a link plate of a silent chain, showing rocker pins inserted into one pin hole in the link plate according to a first embodiment of the present invention;

FIG. 1A is an enlarged view of a portion of FIG. 1;

FIG. 5 is a side view of a link plate with rocker pins inserted into pin holes in the link plate according to the prior art; and FIG. 5A is an enlarged view of a portion of FIG. 5.

DETAILED DESCRIPTION OF THE PREFERRED EMBODIMENTS

Figure 2:
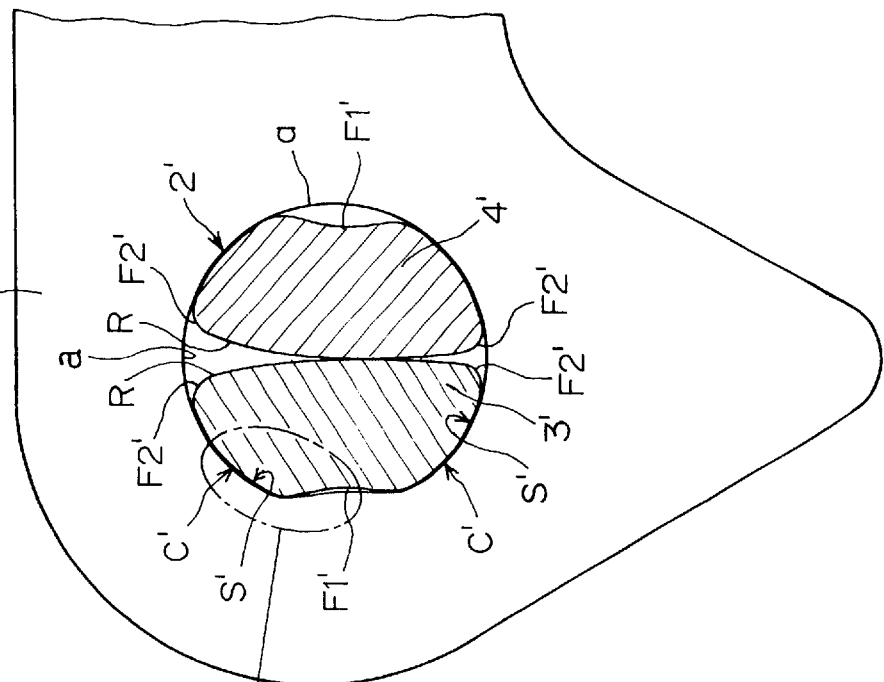
FIG. 2 is a view similar to FIG. 1, but showing rocker pins inserted into one pin hole in a link plate according to a second embodiment of the present invention.

The following description is merely exemplary in nature and is in no way intended to limit the invention or its application or uses.

FIG. 1 is a fragmentary side view of a first embodiment of the present invention showing a link plate of a silent chain having rocker pins inserted therein. The link plate 1 has the same external contour as the conventional link plate A4 shown in FIG. 5.

As shown in FIG. 1, two rocker pins 3 and 4 are inserted in each of two pin holes 2 (one being shown) formed in the link plate 1 in symmetrical relationship with respect to a center of the link plate 1. A large number of such link plates 1 are connected together in an endless fashion to constitute a silent chain.

The rocker pins 3 and 4 have the same cross-sectional shape and inserted into each pin hole 2 of the link plate 1 in such a manner that respective convexly arcuate rocker surfaces R, R are adjacent to each other. The rocker pins 3, 4 each have a first non-contact surface F1 formed on a side opposite to the rocker surface R. The first non-contact surface F1 takes the form of a concavely arcuate surface opposed to an inner peripheral surface of the pin hole 2.

Each rocker pin 3, 4 also has a pair of convexly arcuate load-bearing surfaces C and C contiguous with both circumferential ends of the first non-contact surface F1, and a pair of convexly arcuate second non-contact surfaces F2 smoothly interconnecting the load-bearing surfaces C and both circumferential ends of the rocker surface R, respectively.

Each pin hole 2 in the link plate 1 is formed with a first peripheral surface portion a of a simple circular contour located closer to the center of the link plate 1, and a second peripheral surface portion b opposed to the first non-contact surface F1 of the rocker pin 3 which is located closer to an adjacent outer end of the link plate 1. The second peripheral surface portion b is formed by a convexly arcuate surface bulging toward the center of the link plate 1.

Formed contiguously with both circumferential ends of the convexly arcuate surface b are a pair of concavely arcuate pin-seating surfaces S and S formed in a contour conforming to the contour of the load-bearing surfaces C, C of the rocker pin 3. One end of the pin-seating surfaces C, which is located on the side opposite to the convexly arcuate surface b in the circumferential direction of the pin hole 2, is smoothly connected with the circularly contoured peripheral surface portion a.

Thus, the convexly arcuate load-bearing surfaces C of the rocker pin 3 located closer to an adjacent outer end of the link plate 1 and the concavely arcuate pin-seating surfaces S of each pin hole 2 of the link plate 1 are brought into intimate face-to-face contact with each other, with the convexity and convexity of these arcuate surfaces C, S being in exact matching or register with each other, so that rotation of the rocker pin 3 relative to the pin hole 2, which will often result in wobbling of the rocker pin 3 within the pin hole 2, is prevented.

Under the condition where the load-bearing surfaces C are in exact matching or register with the corresponding pin-seating surfaces S, the first non-contact surface F1 and each of the second non-contact surfaces F2 of the rocker pin 3 define, jointly with the inner peripheral surface of the pin hole 2, first and second slight clearances G1 and G2 (FIG. 1A), respectively. The clearances G1, G2 can be used for holding therein a lubricating oil which is usually from the exterior of the silent chain.

The rocker pin 4, which is paired with the rocker pin 3, is permitted to rock or swivel within the pin hole 2 with its rocker surface R held in contact with the rocker surface R of the mating rocker pin 3. Like the rocker pin 3, the rocker pin 4 is also prevented from rotating relative to each pin hole of a link plate (not shown) which is longitudinally adjacent to the link plate 1 in the traveling direction of the silent chain.

Figure 3:
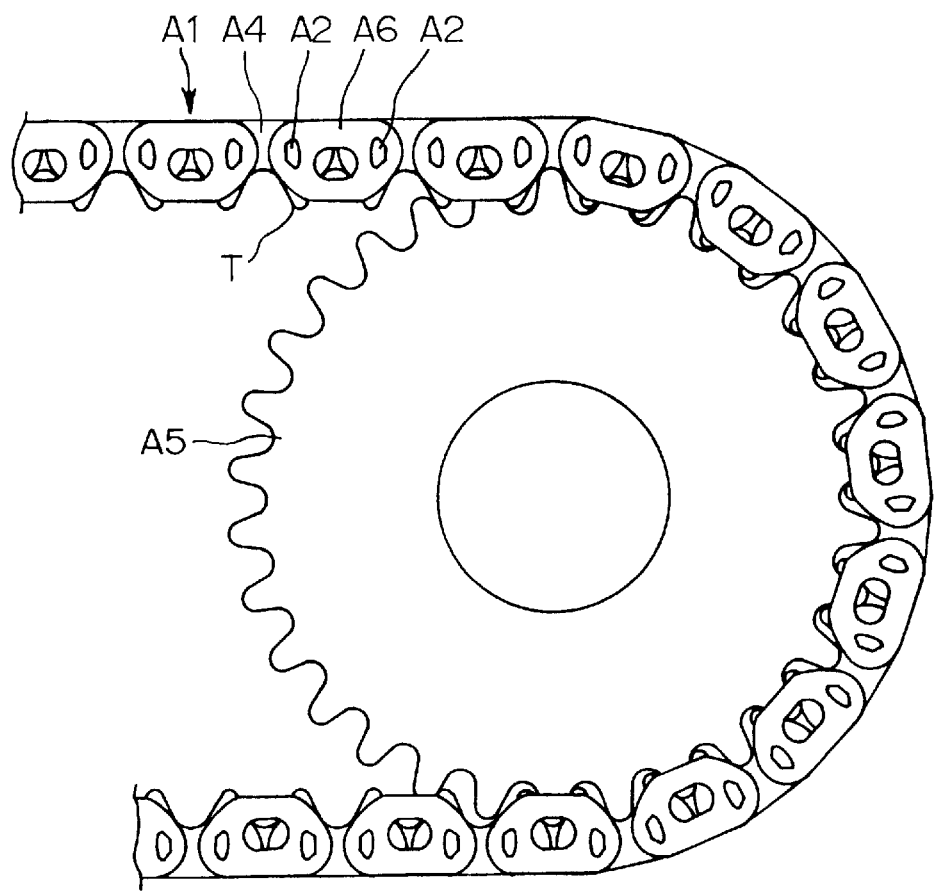
FIG. 3 is a partial side view showing an apparatus of conventional silent chain.
Figure 4:
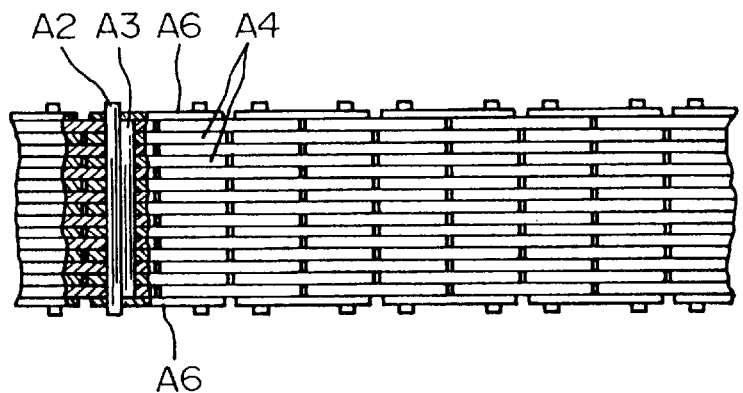
FIG. 4 is a plan view, with parts in cross section for clarity, of the silent chain.

Though not shown, the rocker pin 3 is longer than the rocker pin 4 and have opposite end portions projecting from opposite ends of the rocker pin 4. The opposite end portions of the rocker pin 3 are firmly fitted in guide plates which are the same as those A6 of the conventional silent chain shown in FIG. 3.

FIG. 2 is a fragmentary side view of a second embodiment of the present invention showing a link plate of a silent chain having two rocker pins inserted in each pin hole in the link plate. In this embodiment, a pair of pin-seating surfaces S', S' formed in each pin hole 2' of the link plate 1' and a pair of load-bearing surfaces C' of each of the rocker pins 3' and 4', which are engaged in exact matching with the pin-seating surfaces S', have a contour different from the contour of the corresponding mated surfaces S, C of the first embodiment shown in FIGS. 1 and 1A.

As better shown in FIG. 1A, each of the load-bearing surfaces C' of the rocker pins (one locker pin 3' being shown) is composed of a first convexly arcuate surface C'1 contiguous with a concavely arcuate first non-contact surface F1' in a circumferential direction, and a second convexly arcuate surface C'2 contiguous with the first convexly arcuate surface C'1. The first convexly arcuate surface C'1 has a radius of curvature R1 which is smaller than a radius of curvature R2 of the second convexly arcuate surface C'2. The radius of curvature R2 of the second convexly arcuate surface C'2 is substantially equal to a radius of a circular peripheral surface portion a of the pin hole 2'.

The rocker pins 3', 4' each have a second non-contact surface F2' of a short arc extending between each circumferential end of the rocker surface R and an adjacent one of the load-bearing surfaces C'.

In the second embodiment described above, the respective first convexly arcuate surfaces C'1 of the load-bearing surfaces C' of the rocker pin 3 and the pin-seating surfaces S' of the pin hole 2' are brought into abutment with each other in an exactly matched or registered condition to thereby prevent rotation of the rocker pin 3' relative to the pin hole 2'. At the same time, the second convexly arcuate surface C'2 of each of the load-bearing surfaces C' and a corresponding one of the pin-seating surfaces S' are also brought into abutment with each other in an exactly matched condition with the result that a relatively large contact area is provided between the rocker pin 3' and the peripheral surface of the pin hole 2', which will offer a substantial reduction in contact pressure between the rocker pin 3' and the link plate 1'.

Figure 2A:
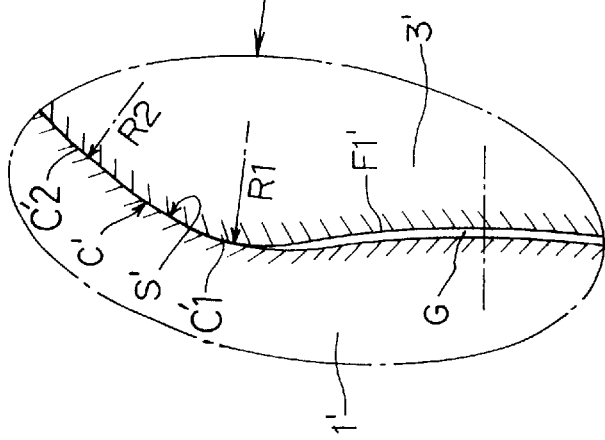
FIG. 2A is an enlarged view of a portion of FIG. 2.

When the load-bearing surfaces C' of the rocker pin 3' are in intimate face-to-face contact with the corresponding pin-seating surfaces S' of the pin hole 2' as described above, the first non-contact surface F' of the rocker pin 3' and the convexly arcuate surface b of the peripheral surface of the pin hole 2' define therebetween a slight clearance G (FIG. 2A) in which lubricating oil can be retained.

In FIG. 2, the state of abutting engagement between the pin hole 2' of the link plate 1' and the rocker pin 3' is shown. The rocker pin 4' which is paired with the rocker pin 3' is permitted to rock or swivel within the pin hole 2' with its rocker surface R held in contact with the rocker surface R of the rocker pin 3'. Additionally, like the rocker pin 3', the rocker pin 4' is also prevented from rotating relative to each pin hole of a link plate (not shown) which is longitudinally adjacent to the link plate 1' in the traveling direction of the silent chain.

The shape of the load-bearing surfaces of the rocker pins and of the pin-seating surfaces of each pin hole of the link plate should by no means be limited to those shown in the foregoing embodiments but may include various modifications provided that load-bearing surfaces and pin-seating surfaces of a modified shape match each other at distant two locations while preventing rotation and wobbling of the rocker pin relative to the pin hole.

As described above, in a silent chain according to the present invention, each rocker pin has a pair of load-bearing surfaces formed on both circumferential ends of a non-contact surface formed on a side opposite to a convexly arcuate rocker surface of the rocker pin. The load-bearing surfaces are supported by a pair of pin-seating surfaces formed on a part of the inner peripheral surface of each of two pin holes in each link plate in such a manner that the load-bearing surfaces and the pin-seating surfaces are in intimate face-to-face contact with each other. With this engagement, rotation and wobbling of the rocker pin within the pin hole are surely prevented. Additionally, a clearance formed between the inner peripheral surface of the pin hole and each of the first and second non-contact surfaces can hold a lubricating oil supplied from the exterior of the silent chain. The lubricating oil may gradually enter between the inner peripheral surface and the peripheral surface of the rocker pin and thus prevents the occurrence of boundary lubrication. With this lubrication, wear elongation of the silent chain can be effectively diminished.

The load-bearing surfaces of each rocker pin may be composed of a combination of two convexly arcuate surfaces of different radii of curvature. In this case, it becomes possible to increase a contact area of the load-bearing surfaces. With this increased contact area, the contact pressure between the rocker pin and the inner peripheral surface of the pin hole decreases correspondingly. This may add to the reduction of wear elongation of the silent chain.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain comprising:
   a multitude of link plates, each link plate having two pin holes formed therethrough in symmetrical relationship with respect to a center of said link plate; and
   first and second rocker pins being inserted into each of the two pin holes of each said link plate in such a manner that convexly arcuate rocker surfaces of said first and second rocker pins are adjacent with each other to bendably interconnect said link plates,
   wherein an outer peripheral surface of each of said first and second rocker pins is formed with said rocker surface, a first non-contact surface opposed to an inner peripheral surface of said each pin hole on a side opposite to said rocker surface, a pair of load-bearing surfaces contiguous with both circumferential ends of said first non-contact surface, and two second non-contact surfaces interconnecting said pair of load-bearing surfaces and both circumferential ends of said rocker surface, respectively, wherein said inner peripheral surface of each said pin hole has a portion formed in a pair of pin-seating surfaces being in register with said pair of load-bearing surfaces of each said rocker pin, respectively, to prevent rotation of said rocker pin within each said pin hole, and wherein when said load-bearing surfaces and the corresponding pin-seating surfaces are in register with each other, said first non-contact surface and each of said second non-contact surfaces define, jointly with said inner peripheral surface of each said pin hole, two slight clearances spaced in a circumferential direction of the pin hole.

2. A silent chain according to claim 1, wherein each of said pair of load-bearing surfaces is formed with a first convexly arcuate surface having one circumferential end connected to said first non-contact surface, and a second convexly arcuate surface contiguous with the other circumferential end of said first convexly arcuate surface and having a radius of curvature smaller than a radius of curvature of said first convexly arcuate surface.

3. A silent chain according to claim 2, wherein said portion of said inner peripheral surface of each said pin hole has a contour conforming to the circumference of a circle, and said radius of curvature of second convexly arcuate surface is substantially equal to a radius of said circle.

4. A silent chain according to claim 1, wherein said first non-contact surface is a concavely arcuate surface, and said inner peripheral surface of each said pin hole has a second portion opposed to said first non-contact surface and formed in a convexly arcuate surface protruding toward a center of said pin hole.

* * * * *